(12) United States Patent
Poetscher et al.

(10) Patent No.: US 11,501,093 B2
(45) Date of Patent: Nov. 15, 2022

(54) METHOD OF MANAGING AN OUTPUT POWER DELIVERED BY AN ANTENNA OF A NFC APPARATUS AND NFC APPARATUS

(71) Applicant: STMicroelectronics Austria GmbH, Graz (AT)

(72) Inventors: Thomas Poetscher, Deutschfeistritz (AT); Michael Gugganig, Lamberg (AT)

(73) Assignee: STMicroelectronics Austria GmbH, Graz (AT)

( * ) Notice: Subject to any disclaimer, the term of this patent is extended or adjusted under 35 U.S.C. 154(b) by 312 days.

(21) Appl. No.: 16/773,191

(22) Filed: Jan. 27, 2020

(65) Prior Publication Data
US 2020/0242309 A1    Jul. 30, 2020

(30) Foreign Application Priority Data
Jan. 28, 2019   (EP) .................................... 19153981

(51) Int. Cl.
*H04B 5/02* (2006.01)
*G06K 7/00* (2006.01)
(Continued)

(52) U.S. Cl.
CPC ....... *G06K 7/0008* (2013.01); *G06K 7/10297* (2013.01); *G08B 13/2477* (2013.01);
(Continued)

(58) Field of Classification Search
CPC ....... H03C 1/08; H03F 2200/451; H03F 3/19; G11C 13/0004; G11C 13/0038; G11C 13/0069; G11C 5/145; G11C 5/147; H01Q 13/10; H01Q 19/00; H01Q 1/38; H01Q 7/00; H01Q 1/2216; H01Q 1/2225; H01Q 1/246; H01Q 1/273; H01Q 1/50; H01Q 1/521; H04W 76/14; H04W 4/80; G06K 19/0722; G06K 19/0726; G06K 19/073; G06K 7/0095; G06K 19/0701;
(Continued)

(56) References Cited

U.S. PATENT DOCUMENTS

2007/0296593 A1*  12/2007  Hall ................... G08B 13/2477
                                                        343/745
2014/0106668 A1*  4/2014  Krishnan ............. H04B 5/0075
                                                        455/41.1
(Continued)

FOREIGN PATENT DOCUMENTS

WO      2014058578 A2    4/2014

*Primary Examiner* — Dionne Pendleton
(74) *Attorney, Agent, or Firm* — Slater Matsil, LLP (57) ABSTRACT

In an embodiment, a method of managing an output power delivered by an antenna of a NFC apparatus includes: providing a matching circuit with a first tuning capacitive network coupled in series between a NFC controller and the antenna and with a second tuning capacitive network coupled to the NFC controller and the antenna and to a reference terminal, wherein the first or second tuning capacitive network has a variable capacitive value; determining tuning capacitive values of the first tuning capacitive networks to adjust a delivered output power at a desired level; and setting the tuning capacitive values of the first tuning capacitive network to the tuning capacitive values.

24 Claims, 3 Drawing Sheets (51) Int. Cl.
*H04B 17/12* (2015.01)
*H04W 4/80* (2018.01)
*G06K 7/10* (2006.01)
*H04B 5/00* (2006.01)
*G08B 13/24* (2006.01)
*H04W 52/00* (2009.01)

(52) U.S. Cl.
CPC ......... *H04B 5/0012* (2013.01); *H04B 5/0031* (2013.01); *H04B 5/0037* (2013.01); *H04B 5/0081* (2013.01); *H04B 17/12* (2015.01); *H04W 4/80* (2018.02); *H04W 52/00* (2013.01)

(58) Field of Classification Search
CPC ........... G06K 19/0715; G06K 19/0723; G06K 7/0008; G06K 7/10297; G06K 19/0724; H03G 1/0088; H03G 2201/307; H03G 3/001; H03G 3/008; H03G 3/3036; H04B 5/0031; H04B 5/0025; H04B 1/40; H04B 5/0075; H04B 5/0081; H04B 5/0056; H04B 17/12; H04B 5/0012; H04B 5/0037; H04B 5/0087; H04B 7/0602; G06F 2009/45595; G06F 7/58; G06F 7/588; G06F 9/45558; G06F 9/4881; H04L 12/2803; H04L 12/4633; H04L 49/40; H04L 61/1511; H04L 61/2007; H04L 61/2514; H04L 61/2553; H04L 61/256; H04L 61/2575; H04L 61/2585; H04L 61/2589; H04L 61/2592; H04L 61/609; H04L 63/0272; H04L 63/0281; H04L 63/029; H04L 63/164; H04L 67/02; H04L 67/025; H04L 67/1008; H04L 67/1021; H04L 67/141; H04L 67/142; H04L 67/28; H04L 67/2814; H04L 67/2838; H04L 67/2847; H04L 67/288; H04L 67/2885; H04L 67/327; H04L 67/40; H04L 67/42; H04L 69/16; H04L 69/162; H04L 69/325; H04L 69/326; H04L 69/329; H03H 7/40; H03H 11/245; H03H 7/24; H02J 50/20; H01L 23/495; H01L 2924/00; H01L 2924/0002; H01G 4/35; A61N 1/025; A61N 1/05; A61N 1/08; A61N 1/3605; A61N 1/37205; A61N 1/37229; A61N 1/37252; A61N 1/375; A61N 1/3754; A61N 1/3787; G08B 13/2468; G08B 13/2477
See application file for complete search history.

(56) References Cited

U.S. PATENT DOCUMENTS

2016/0112028 A1\* 4/2016 Baier ...................... H01Q 1/50
333/33
2020/0394486 A1\* 12/2020 Rizzo ................... H04B 5/0056

\* cited by examiner

METHOD OF MANAGING AN OUTPUT POWER DELIVERED BY AN ANTENNA OF A NFC APPARATUS AND NFC APPARATUS

CROSS-REFERENCE TO RELATED APPLICATIONS

This application claims priority to European Patent Application No. 19153981.6, filed on Jan. 28, 2019, which application is hereby incorporated herein by reference.

TECHNICAL FIELD

The present disclosure relates generally to an electronic system and method, and, in particular embodiments, to a method of managing an output power delivered by an antenna of a near field communication (NFC) apparatus and NFC apparatus.

BACKGROUND

As a matter of fact, further to its conventional telephone function, a mobile phone may be used for exchanging information with a contactless device by using a contactless communication protocol.

In some applications, the mobile phone may be emulated in a card mode. In such a case it operates as a card or a transponder (passive or active) and may be read by a contactless reader.

In some other applications, the mobile phone may be emulated in a reader mode. In such a case it operates as a reader and may cooperate with a contactless tag.

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocol type A and type B.

NFC readers have the capability to support, in particular, a reader/writer mode which can be used to read and write NFC transponders or tags.

Non-contact components, such as NFC controllers, are typically connected to the antenna via an impedance matching circuit for the purpose of optimizing radio frequency communication.

Generally, the impedance matching circuit incorporates a filter for filtering electromagnetic interference (EMI) as well as serial and parallel matching capacitors.

More precisely, this external EMI filter, which is generally a capacitive inductive filter (LC filter), makes it possible to reduce as much as possible the high harmonic emissions of the transmission signal, typically at 13.56 MHz.

And, these external components used in this impedance matching circuit for example inductive elements and capacitors, must be very well dimensioned, so as to allow good frequency matching of the antenna, for example on a carrier frequency, (e.g., 13.56 MHz), and thus ensure the maximum performance.

In general, there are differences between the theoretical values of these external components and the antenna and the actual values thereof when actually made and physically connected to the NFC component. This is due in particular to the technological dispersions of the external components and the antenna used which can be all the more important as the external components, in particular, are of lesser quality.

This then may result in a frequency detuning of the antenna.

This frequency detuning of the antenna can also be caused by the magnetic coupling with the antenna of another NFC object, for example a NFC tag.

State of the art solutions include shielding the antenna against detuning and/or using matching components with low tolerances.

SUMMARY

Some embodiments relate to wireless communication between apparatuses, for example between a reader and a transponder. Some embodiments relate in particular to wireless communication between a NFC contactless reader and a tag, for example a contactless IC card or a wireless apparatus emulated in card mode, such as a mobile phone or a phablet emulated in card mode, or a dynamic tag (i.e., a tag connected to a microprocessor within a connected device), using typically a high frequency communication operating at 13.56 MHz.

Some embodiments relate to the management of the output power delivered by the antenna of a NFC apparatus, for example a NFC reader, in particular when the reader antenna may be detuned by environmental effects and/or by the tag itself.

The NFC reader may be a reader as such or for example a mobile phone emulated in a reader mode.

Some embodiments adjust the output power and thus the power consumption of a NFC apparatus (for example a NFC reader) to a desired target.

In some embodiments, even when suffering from detuning, the matching is adjusted in a way that is compliant to a standard, e.g., a standard of the NFC platform, and the best output power can be delivered.

Thus, for example, in some embodiments, a reader could switch between high and low output power depending on current needs.

Some embodiments use a two-dimensional antenna tuning (i.e., a tuning using parallel and series variable capacitors) controlled by an algorithm. In some embodiments, such tuning enables to adjust in particular the resonance frequency of the antenna as well to adjust the matching impedance at resonance frequency, and thus to adjust in particular the output power delivered by the NFC reader.

Some embodiments relate to a method of managing an output power delivered by an antenna of a NFC apparatus, in particular a NFC reader, where, e.g., the antenna is coupled to a NFC controller by a matching circuit.

In some embodiments, the method comprises providing the matching circuit with a first tuning capacitive network connected in series between the NFC controller and the antenna and with a second tuning capacitive network coupled on one hand to the NFC controller and the antenna and on another hand to a reference terminal, for example a terminal intended to be connected to ground.

In some embodiments, at least one of both tuning capacitive networks has a variable capacitive value.

In some embodiments, the method also comprises:
determining at least partially by software, tuning capacitive value of the first and second tuning networks permitting to adjust the delivered output power at a desired level; and
setting the capacitive value of the first and second tuning capacitive network to the tuning capacitive values.

In some embodiments, the first tuning capacitive network may be considered as being so called "serial capacitors"

while the second tuning capacitive network may be considered as being so called "parallel capacitors."

In some embodiments, at least one of the first and second tuning capacitive networks is a variable capacitive network. In such embodiments, the other capacitive network may be fixed.

In some embodiments, however, in order to cover more situations, it may be preferable that both tuning capacitive networks have a variable capacitive value.

According to an embodiment, the at least one of both tuning capacitive networks is a tuning capacitive networks having a set of selectable capacitive values.

Practically, such set of selectable capacitive values may be obtained for example by a set of switched capacitors having those selectable capacitive values or by one or more tunable capacitors, controlled by a control signal issued, for example, from a digital control word.

When both tuning capacitive networks have a variable capacitive value, the first tuning capacitive network may have a first set of selectable capacitive values while the second capacitive tuning network may have a second set of selectable capacitive values.

Providing two tuning capacitive networks, e.g., as defined above, at least one of them having a variable capacitive value, may permit using a two-dimensional antenna tuning controlled by an algorithm. This may enable, e.g., adjusting the resonance frequency of the antenna to adjust the matching impedance at resonance frequency. This may also permit adjusting the output power delivered by the NFC apparatus, and accordingly, the power consumption, to a desired level. And even when suffering from detuning, the matching can be adjusted in a way that is compliant to a standard and the best output power can be delivered.

In other words, the two-dimensional dynamical adjustment of the matching circuit may permit to dynamically adjust the matching impedance and, thus, the output power can be freely chosen and measured within a certain limit.

And, if the reader is suffering from detuning, countermeasures are possible to work against these effects.

According to an embodiment, determining the tuning capacitive values of the first and second tuning networks comprises executing a search algorithm, the search algorithm using measurements for at least several capacitive values of the capacitive networks, of respective sets of parameters including a respective voltage at the antenna, a respective current delivered in the matching circuit by the NFC controller, and a respective phase between the current delivered by the NFC controller and the current received by the NFC controller.

In some embodiments, the search algorithm advantageously selects the tuning capacitive values of the first and second tuning capacitive network on the basis of those of sets of measured parameters and a set of corresponding target parameters. In other words, determining the tuning capacitive values, use evaluation of, e.g., three parameters: voltage, current, phase (V, I, P).

Evaluation of those three parameters can be seen for example as an extremum search in three two-dimensional arrays.

Thus, according to an embodiment, selecting the tuning capacitive values of the first and second tuning capacitive networks comprises determining a minimum of a weighting function of the measured and corresponding target parameters.

More precisely, according to an embodiment, selecting the tuning capacitive values comprises
calculating for each pair of selectable values respectively belonging to the first and second tuning capacitive networks and designated by the search algorithm, a value of the weighting function; and
selecting as the tuning capacitive values, the pair of selectable values corresponding to the minimum value of the weighting function.

In other words, the search algorithm starts from a starting point having two respective capacitive values of the first and second tuning capacitive networks. And, depending of the type of search algorithm, the search algorithm browses the points of the two capacitive networks in a certain manner until finding the best point, i.e., the point for which the weighting function is minimum.

The search algorithm may be advantageously selected among a set of reference search algorithms.

The selection of the search algorithm may depend on the environmental conditions and/or a trade-off between execution time and accuracy for example. By using an appropriate search algorithm, it is possible to minimize the number of measurements.

For best performance, it may be preferable to repeat the execution of the search algorithm whenever the environmental of the apparatus and/or the V, I, P, parameters inputs change.

For example, the search algorithm may be executed before every communication session between the NFC apparatus and another NFC apparatus.

In accordance with an embodiment, a NFC apparatus includes:
an antenna coupled to a NFC controller by a matching circuit,
the matching circuit including a first tuning capacitive network connected in series between the NFC controller and the antenna and a second tuning capacitive network coupled on one hand to the NFC controller and the antenna and on another hand to a reference terminal, at least one of both tuning capacitive networks having a variable capacitive value,
a control circuit configured for determining at least partially by software, tuning capacitive values of the first and second tuning networks permitting to adjust the delivered output power at a desired level, and
a setting circuit configured for setting the capacitive values of first and second tuning capacitive networks to the tuning capacitive values.

According to an embodiment, the at least one of both tuning capacitive networks is a tuning capacitive network having a set of selectable capacitive values.

According to an embodiment, both tuning capacitive networks have a variable capacitive value.

According to an embodiment, the first tuning capacitive network has a first set of selectable capacitive values and the second tuning capacitive network has a second set of selectable capacitive values.

According to an embodiment, the control circuit comprises:
a measurement circuit configured to measure for at least several capacitive values of the capacitive networks, respective sets of parameters including a respective voltage at the antenna, a respective current delivered in the matching circuit by the NFC controller, and a respective phase between the current delivered by the NFC controller and the current received by the NFC controller, and
a software module configured to execute a search algorithm using the measurements and selecting the tuning capacitive values of the first and second tuning capacitive networks on the basis of those sets of measured parameters and a set of corresponding target parameters.

According to an embodiment, the setting circuit comprises registers, where the control circuit is configured to store in the registers indications (for example digitals words) corresponding to the tuning capacitive values, and the setting circuit is configured to adjust the capacitive values of the first and second tuning capacitive networks in accordance with the contents of the registers.

According to an embodiment, the software module is configured to determine a minimum of a weighting function of the measured and corresponding target parameters.

According to an embodiment, the software module is configured to calculate for each pair of selectable values respectively belonging to the first and second tuning capacitive networks and designated by the search algorithm, a value of the weighting function and to select as the tuning capacitive values, the pair of selectable values corresponding to the minimum value of the weighting function.

According to an embodiment, the NFC apparatus further comprises a memory configured to store a set of reference search algorithms, and a management module is configured to select the search algorithm among the set of reference search algorithms.

According to an embodiment, the NFC apparatus, for example, a NFC reader, further comprises a microcontroller coupled to the NFC controller, the microcontroller incorporating the software module and the NFC controller incorporating the setting circuit.

BRIEF DESCRIPTION OF THE DRAWINGS

Other advantages and features of embodiments of the present invention will appear in the detailed description bellow and in the appended drawings which are not limitative, in which.

DETAILED DESCRIPTION OF ILLUSTRATIVE EMBODIMENTS

Figure 1:
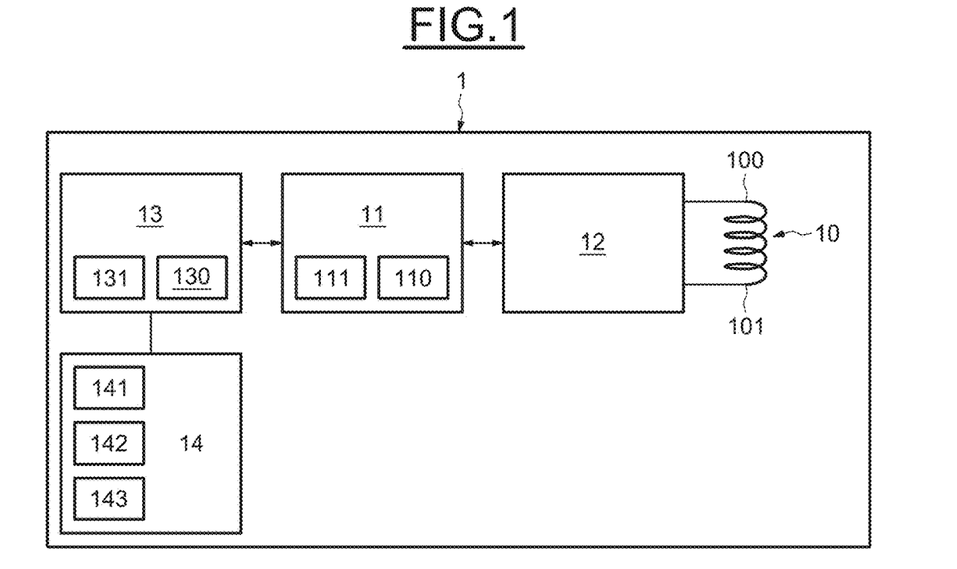
FIGS. 1-4 illustrate particular embodiments of the present invention.

On FIG. 1, reference 1 designates a NFC apparatus, for example a NFC reader, comprising an antenna 10 having two antenna terminals 100 and 101. The antenna 10 is coupled to a NFC controller 11 through a matching circuit 12.

The NFC controller is also coupled to a microcontroller 13.

As a non-limiting example, the NFC controller may be the one having the internal reference ST25R3916 within STMicroelectronics.

As it will be explained more in detail thereafter, the NFC controller comprises a measurement circuit no configured to measure a set of parameters including a voltage, a current, and a phase.

The NFC controller comprises also a setting circuit 111 configured to set capacitive values of both tuning capacitive networks incorporated in the matching circuit, to tuning capacitive values determined after the execution of a search algorithm located within a software module 130 of the microcontroller 13.

As it will be explained more in detail thereafter, several possible reference search algorithms may be used and are stored in a non-volatile memory 14, and the search algorithm that is executed is selected among those stored reference search algorithms.

In the example disclosed in FIG. 1, three possible reference search algorithms 141, 142, 143 are stored in the non-volatile memory 14. In some embodiments, a different number of reference search algorithms may be used.

The microcontroller 13 comprises a management module 131, e.g., realized by software or by a logic circuit, configured to select the appropriate search algorithm depending on a desired criteria.

Figure 2:
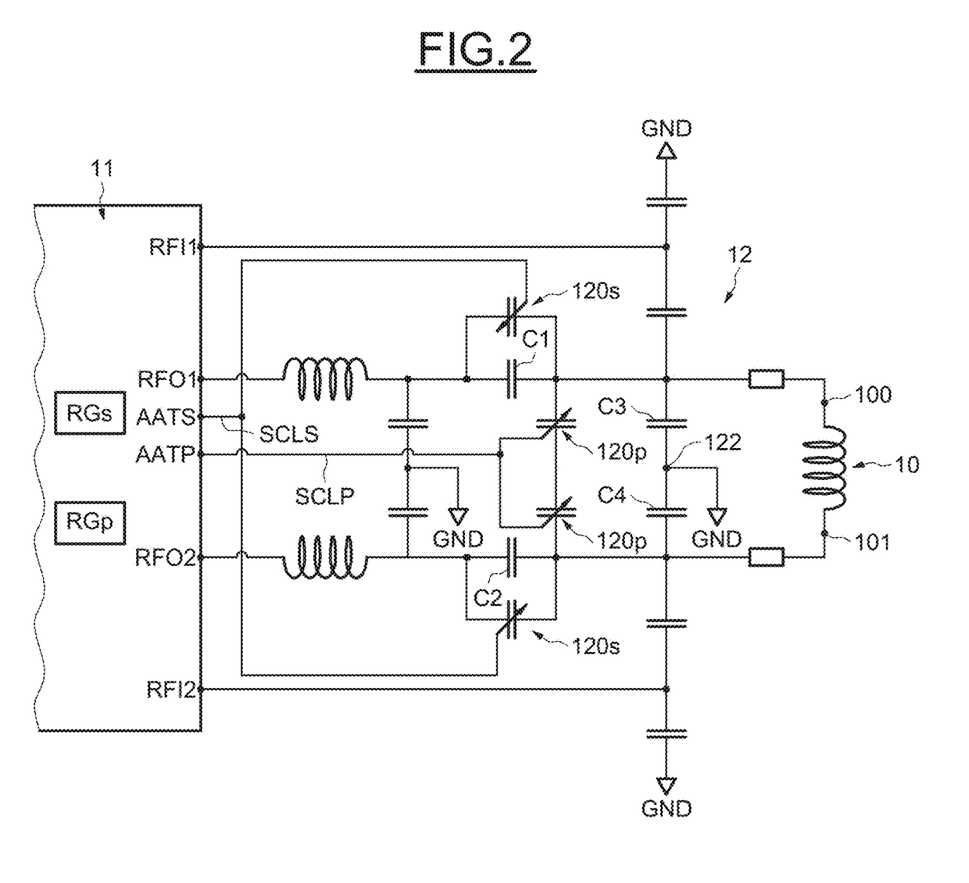

As illustrated in more detail in FIG. 2, the matching circuit 12 comprises conventional external inductive, capacitive and resistive components.

This matching circuit 12 is coupled to the antenna terminals 100 and 101 and conventionally incorporates an EMI filter.

In some embodiments, such as shown in FIG. 2, the architecture of the matching circuit is a differential architecture. Some embodiments may be implemented as with a single-ended architecture.

As shown in FIG. 2, in the differential architecture, the matching circuit 12 is connected to ground GND and to input terminals RFI1 and RFI2 of the NFC controller 11, and to output terminals RFO1 and RFO2 of the NFC controller 11.

Further to those conventional external components, the matching circuit 12 comprises a first tuning capacitive network 120s connected in series between the NFC controller and the antenna.

More precisely, in this differential architecture, the first tuning capacitive network 120s comprises a first variable capacitor 120s coupled in series between the output terminal RFO1 and the antenna terminal 100 and a second variable capacitor 120s coupled in series between the second output terminal RFO2 and the antenna terminal 101.

Those variable capacitors 120s are also respectively coupled in parallel with two external "series" capacitors C1, C2 of the matching circuit 12.

The first tuning capacitive network 120s may be also called, accordingly, a "series" tuning capacitive network.

Each of the variable capacitors 120s may comprise a first set of switched capacitors having respectively different selectable capacitive values or a tunable capacitor.

Such a tunable capacitor may be for example the one having the internal reference STPTIC-15G2 within STMicroelectronics. Such a tunable capacitor advantageously offers excellent RF performance, low power consumption, and high linearity, which may be required in adaptive RF tuning applications.

The capacitive value of the first tuning capacitive network 120s is controlled by a control signal SCLS delivered by a first auxiliary output AATS of the NFC controller.

The matching circuit 12 comprises also a second tuning capacitive network 120p coupled on one hand to the NFC controller and the antenna and on another hand to a reference terminal 122 which is here intended to be connected to a reference voltage, typically ground GND.

The second tuning capacitive value may be thus called a "parallel" tuning capacitive network.

In this differential architecture, the second tuning capacitive network comprises two variable capacitors 120p.

A first variable capacitor 120p is connected on one hand to the output terminal RFO1 and the antenna terminal boo and on another hand to the reference terminal 122.

The other variable capacitor 120p is connected on one hand to the output terminal RFO2 and the antenna terminal 101 and on another hand to the reference terminal 122.

Those two variable capacitors 120p are also connected in parallel with two conventional parallel capacitors C3 and C4 of the matching circuit 12.

Similarly to the first tuning capacitive network, each variable capacitor 120 may comprise a second set of switched capacitors or a tunable capacitor. And, the capacitive values of those variable capacitors 120p are controlled by a second control signal SCLP delivered by a second auxiliary output AATP of the NFC controller.

As an example, the tunable capacitor STPTIC-15G2 mentioned above, which comprises barium strontium titanate (BST), may be controlled through an extended bias voltage ranging from 1 to 24 V.

As it will be explained in more detail later, the values of those control signals SCLS and SCLP are given by the content of registers RGs and RGp incorporated in the NFC controller and belonging to the setting circuit.

For example, for each variable tuning capacitor 120s and 120p, the ratio between the minimum capacitive value and the maximum capacitive value may be equal, for example, to 0.5, allowing therefore a reduction of the capacitance by 50%.

For example, a range of selectable capacitive values from 45 pF to 90 pF can be used. It is also possible to use for example a range from 100 pF to 200 pF or a range from 30 pF to 600 pF.

The choice of the range depends in particular on the antenna to match. A person skilled in the art will be able to choose a suitable range of capacitive values depending on the characteristics of the antenna.

Further, the amount of parallel capacitance needed to change the resonance frequency from the self-resonance frequency of the antenna to the carrier frequency (13.56 MHz for example) may depend on the antenna itself.

A person skilled in the art will be able to adjust the needed amount of parallel capacitance.

Figure 3:
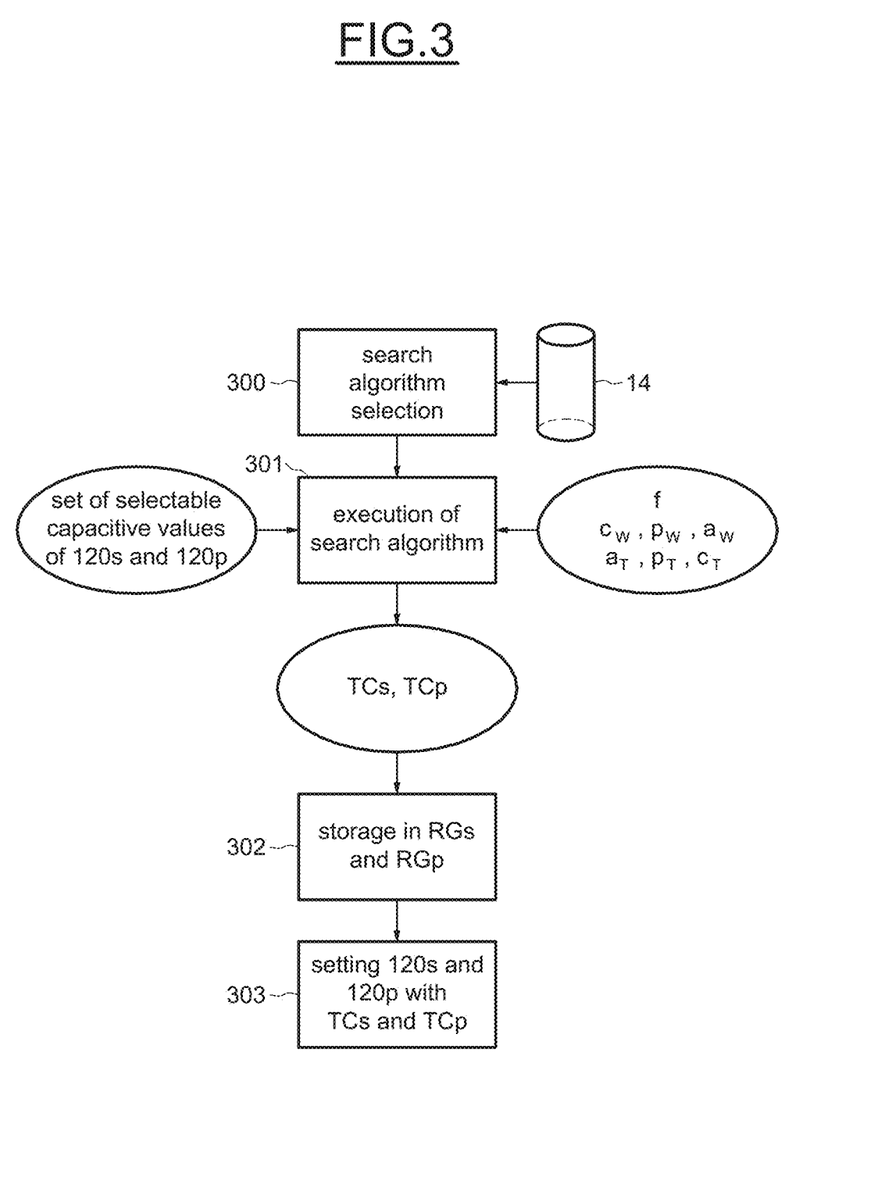
Figure 4:
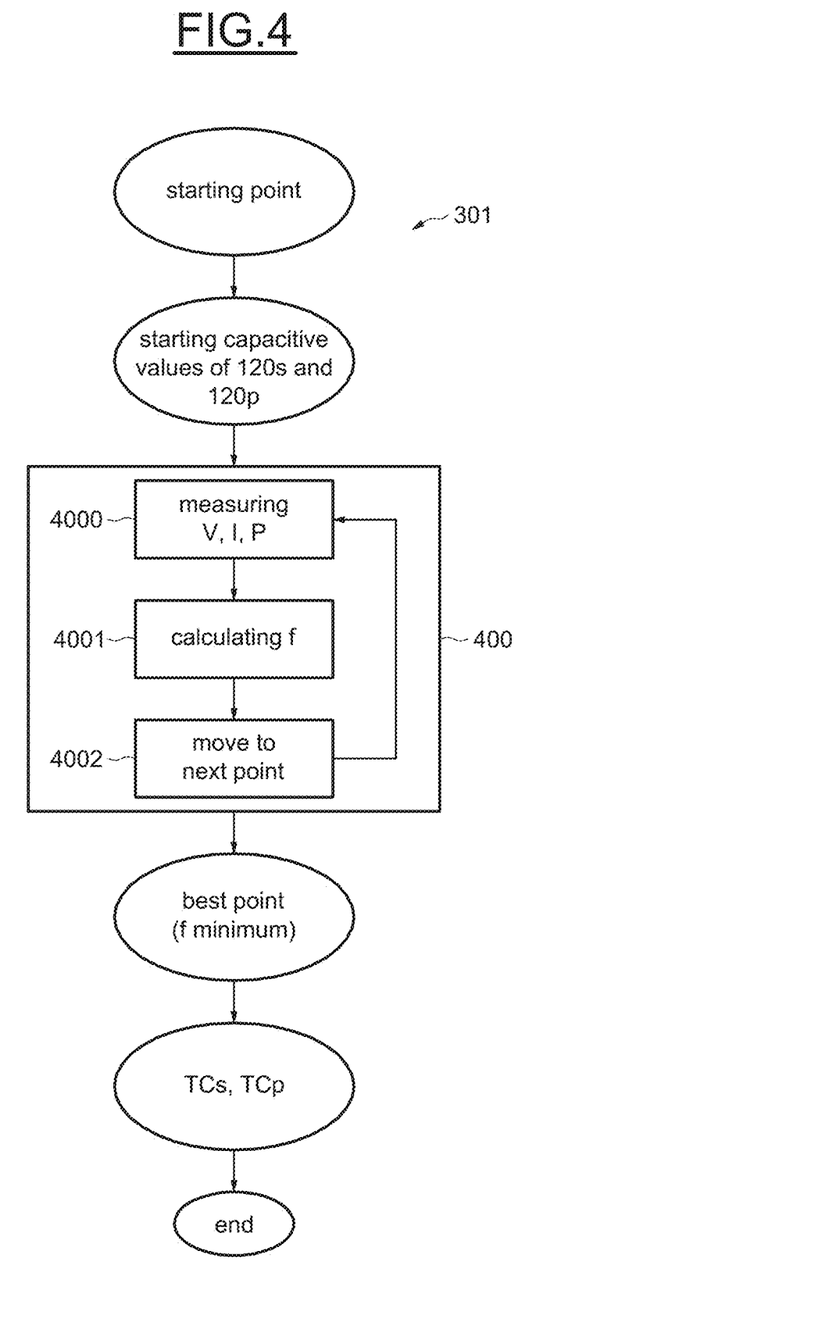

We refer now more particularly to FIGS. 3 and 4 for describing more in details a particular embodiment of a method, according to embodiments of the present invention.

As illustrated in FIG. 3, in a first step 300, the managing module 131, located within the microcontroller, selects the search algorithm to be used for obtaining the tuning capacitive values of both various capacitors 120s and 120p.

As indicated above, this selection is made among a set of possible reference search algorithms stored in the non-volatile memory 14.

Different possible search algorithm will be detailed later.

After this selection 300, the software module 130 located within the microcontroller 13, executes the selected search algorithm.

As it will be explained more in details later, this search algorithm browses the set of selectable capacitive values of the capacitors 120s and 120p and uses a weighting function f as well as different weighting coefficients $a_W$, $p_W$, $c_W$ as well as target parameters $a_T$, $p_T$ and $c_T$.

The result of the execution of the search algorithm is a pair of tuning capacitive values TCs and TCp for the respective capacitors 120s and 120p, which will permit to obtain a desired level for the output power delivered by the NFC apparatus.

Indications (for examples digital words) corresponding to those tuning capacitive values TCs and TCp are stored (in step 302) in the register RGs and RGp.

Then, the setting circuit sets in step 303 the capacitors 120s and 120p with those tuning capacitive values TCs and TCp.

Reference is now made to FIG. 4 to illustrate in more details the execution of step 301 of the search algorithm.

The two sets of selectable capacitive values of both tuning capacitive networks 120s and 120p may be considered as being a matrix or an array of points, each point being for example defined by a logical value of a digital word.

For example, if the digital word has 8 bits, up to 256 points may be designed by the logical value of the digital word.

The execution of the search algorithm begins by selecting a starting point.

This starting point may be an arbitrary starting point or eventually the point resulting from a last execution of the search algorithm.

This starting point is associated to starting capacitive values of the networks 120s and 120p.

Then, in step 400, generally speaking, for each point designated by the search algorithm, three parameters V, I and P are measured (step 4000).

V is the voltage, equal to the voltage on the antenna, which may be measured at the NFC controller inputs RFI1, RFI2. This voltage may be measured by a conventional circuit inside the NFC controller.

I is the current delivered in the matching circuit by the NFC controller at the terminals RFO1, RFO2.

The driver of the reader is typically supplied through an integrated low-dropout regulator (LDO regulator). Therefore, it is possible to measure the DC current which is consumed by the driver and outputted through the terminals RFO1, RFO2.

P is the phase between the current delivered by the NFC controller and the current received by the NFC controller. In other words, the phase may be measured as being the phase difference between the signals at the terminals RFO and the signals at the terminals RFI of the NFC controller. This measurement is similar to the voltage measurement and can be made by a conventional circuit inside the NFC controller.

After having measured those parameters V, I and P, for that point, the search algorithm calculates a weighting function f in step 4001, for that point.

The weighting function uses the measured parameters as well as corresponding target parameters which are determined taking into account the desired output power delivered by the NFC apparatus.

This function also uses weighting coefficients. Many possible weighting functions are possible. For example, it is possible to use a weighting function according to formulas (I), (II) or (III):

$$f(a,c,p) = (a_w * |a - a_T|) + (c_w * |c - c_T|) + (p_w * |p - p_T|) \quad \text{(I)}$$

$$f(a,c,p) = (p * |a - a_T|) + (p * |c - c_T|) + (p_w * |p - p_T|) \quad \text{(II)}$$

$$f(a,c,p) = (a_w * (a - a_T)^2) + (c_w * (c - c_T)^2) + (p_w * (p - p_T)^2) \quad \text{(III)}$$

where the variable "a" designates the value of the voltage V, the variable "c" designates the value of the current I, and the variable "p" designates the value of the phase P, $a_T$, $c_T$ and $p_T$ designate the corresponding target parameters, and $a_W$, $c_W$ and $p_W$ designate the corresponding weighting coefficients.

Formula (I) discloses a linear relation while formula (II) discloses a linear relation where the weights of amplitude and current depend on the phase. Formula (III) is a non-linear relation, which is more sensitive for small changes of a, c, and p.

A person skilled in the art will be able to choose the suitable weighting function depending on the circumstances.

The weighting coefficients are chosen within the closed interval [0,1] and permit to determine the importance of the corresponding variable of the function. For example, if in a particular application it is desired to reduce the importance of the current to the half of the importance of the voltage, the weighting coefficient $c_W$ could be chosen as equal to $a_W/2$.

As a non-limiting example, the target parameter $a_T$ may vary between 0 mV and 3000 mV while the target parameter $c_T$ may vary between 0 mA and 350 mA and the target parameter $p_T$ may vary between 30° and 150°. For example, to get the maximum output power, it may be desired to have the highest voltage of the antenna, thus choosing the target parameter $a_T$ equal to 3000 mV, at the maximum given current and at a phase of 90°. Thus, the target parameter $c_T$ may be chosen to 350 mA and the target parameter $p_T$ will be chosen to 90°.

It would be also possible to reach the target of 3000 mV with a lower current. In such a case, the target parameter $c_T$ may have a lower value.

If it is desired to have a low output power, it is possible to choose the target parameter $a_T$ equal to 3000 mV, the target parameter $c_T$ equal to 100 mA (which corresponds for example to a maximum current budget) and the target parameter $p_T$ equal to 90°.

After having calculated the weighting function f, the search algorithm moves to the next point (step 4002) except if the last point was considered as being the best point, i.e., the point having the minimum weighting function.

The goal of this search algorithm is to determine the best point having the minimum weighting function. This best point is associated with the tuning capacitive values TCs and TCp for the respective variable capacitors 120s and 120p.

As indicated above, many possible search algorithms can be used depending in particular of a trade-off between accuracy and execution time. For example, an algorithm using a two-stage approach can be used.

In such a case, for each given capacitive value of one of the two capacitors 120s and 120p, all the possible capacitive values of the other capacitor are successively examined and, after all the matrix of points has been examined, the point having the minimum value of the weighting function is selected. Such algorithm permits to find absolute extremum when multiple extrema exist but is relatively slow due to many measurements.

A second possible search algorithm may perform a two-dimensional binary search. More precisely, such algorithm divides the search space (the matrix) into 4 segments and assesses them. The assessment is based on the measurement of the center point of each segment. Those center points are compared by applying the weighting function. The sector with the best assessed value will be taken for the next iteration of the algorithm and the other three sectors are dropped. This is repeated until the remaining sector cannot be divided further. The center point of this last remaining sector is the best point.

Such an algorithm is fast and allows having always the same number of measurements at each execution. However, an early wrong decision on the sector to follow, could lead to a bad result. But this could be improved by taking more point inside a sector for evaluating the sector.

Another possible algorithm is a so-called "hill climb" algorithm. Such "hill climb" algorithm starts from a starting point and measures four points around. The four points will then be assessed with the weighting function. Based on this assessment, the point having the lowest value of the weighting function is the starting point for the next iteration and the points around this new starting point will be measured. This will be repeated until no better point can be found. The best point is thus the center point of the last four measured points. Such algorithm has accurate runtime depending on the starting point.

Generally speaking, using the appropriate search algorithm permits to minimize the number of measurements. For best performance, the tuning could be advantageously repeated whenever the environment changes. The searching algorithm can be improved by choosing starting values that are already close to the search target. For example the starting point for a new execution of the search algorithm may be the best point obtained with a preceding execution of said search algorithm.

What is claimed is:

1. A method of managing an output power delivered by an antenna of a near field communication (NFC) apparatus, the antenna being coupled to a NFC controller by a matching circuit, the method comprising:
   providing the matching circuit with a first tuning capacitive network coupled in series between the NFC controller and the antenna and with a second tuning capacitive network coupled to the NFC controller and the antenna and to a reference terminal, wherein the first or second tuning capacitive network has a variable capacitive value;
   determining tuning capacitive values of the first tuning capacitive network to adjust a delivered output power at a desired level; and
   setting the tuning capacitive values of the first tuning capacitive network to the tuning capacitive values, wherein determining the tuning capacitive values of the first tuning capacitive network comprises executing a search algorithm using measurements of respective sets of parameters of a plurality of capacitive values of the first tuning capacitive network, the search algorithm selecting the tuning capacitive values of the first tuning capacitive network based on the respective sets of measured parameters and a set of corresponding target parameters, and wherein selecting the tuning capacitive values of the first tuning capacitive network comprises determining a minimum of a weighting function of the respective sets of measured parameters and the sets of corresponding target parameters.

2. The method of claim 1, wherein determining the tuning capacitive values comprises determining the tuning capacitive values at least partially by software.

3. The method of claim 1, wherein the first tuning capacitive network is a tuning capacitive network having a set of selectable capacitive values.

4. The method of claim 1, wherein the second tuning capacitive network has a variable capacitive value, the method further comprising determining tuning capacitive values of the second tuning capacitive network to adjust the delivered output power at a desired level.

5. The method of claim 4, wherein the first tuning capacitive network has a first set of selectable capacitive values and the second tuning capacitive network has a second set of selectable capacitive values.

6. The method of claim 1, wherein each set of parameters of the sets of parameters comprises a respective voltage at the antenna, a respective current delivered in the matching circuit by the NFC controller, and a respective phase between the respective current delivered by the NFC controller and a respective current received by the NFC controller.

7. The method of claim 1, wherein the second tuning capacitive network has a variable capacitive value, wherein the first tuning capacitive network has a first set of selectable capacitive values and the second tuning capacitive network has a second set of selectable capacitive values, the method further comprising determining tuning capacitive values of the second tuning capacitive network to adjust the delivered output power at a desired level, wherein selecting the tuning capacitive values comprises:
- calculating, for each pair of selectable values respectively belonging to the first and second tuning capacitive networks and designated by the search algorithm, a value of the weighting function; and
- selecting as the tuning capacitive values, the pair of selectable values corresponding to a minimum value of the weighting function.

8. The method of claim 1, wherein the NFC apparatus is a NFC reader.

9. The method of claim 1, wherein the weighting function is linear.

10. The method of claim 1, wherein the weighting function is non-linear.

11. The method of claim 1, wherein the weighting function comprises weights of voltage and current that are dependent on a phase between a current delivered by the NFC controller and a current received by the NFC controller.

12. A method of managing an output power delivered by an antenna of a near field communication (NFC) apparatus, the antenna being coupled to a NFC controller by a matching circuit, the method comprising:
- providing the matching circuit with a first tuning capacitive network coupled in series between the NFC controller and the antenna and with a second tuning capacitive network coupled to the NFC controller and the antenna and to a reference terminal, wherein the first or second tuning capacitive network has a variable capacitive value;
- determining tuning capacitive values of the first tuning capacitive network to adjust a delivered output power at a desired level;
- setting the tuning capacitive values of the first tuning capacitive network to the tuning capacitive values, wherein determining the tuning capacitive values of the first tuning capacitive network comprises executing a search algorithm using measurements of respective sets of parameters of a plurality of capacitive values of the first tuning capacitive network, the search algorithm selecting the tuning capacitive values of the first tuning capacitive network based on the respective sets of measured parameters and a set of corresponding target parameters; and
- selecting the search algorithm among a set of reference search algorithms.

13. The method of claim 12, wherein the set of reference search algorithms comprises a binary search and a sequential search.

14. A near field communication (NFC) apparatus comprising:
- a NFC controller;
- an antenna coupled to the NFC controller through a matching circuit;
- the matching circuit comprising a first tuning capacitive network coupled in series between the NFC controller and the antenna, and a second tuning capacitive network coupled to the NFC controller and the antenna and to a reference terminal;
- a control circuit configured to determine tuning capacitive values of the first and second tuning capacitive networks to adjust a delivered output power at a desired level; and
- a setting circuit configured to set the capacitive values of the first and second tuning capacitive networks to the tuning capacitive values;

wherein the control circuit comprises:
- a measurement circuit configured to measure for a plurality of capacitive values of the first and second tuning capacitive networks, respective sets of parameters, and
- a software module configured to execute a search algorithm using the respective sets of measured parameters and select the tuning capacitive values of the first and second tuning capacitive networks based on the respective sets of measured parameters and a set of corresponding target parameters;

wherein the setting circuit comprises registers, wherein the control circuit is configured to store in the registers indications corresponding to the tuning capacitive values; and wherein the setting circuit is configured to adjust the capacitive values of the first and second tuning capacitive networks in accordance with a content of the registers.

15. The NFC apparatus of claim 14, wherein one tuning capacitive network of the first and second tuning capacitive networks is a tuning capacitive network having a set of selectable capacitive values.

16. The NFC apparatus of claim 14, wherein the first and second tuning capacitive networks each have a variable capacitive value.

17. The NFC apparatus of claim 16, wherein the first tuning capacitive network has a first set of selectable capacitive values and the second tuning capacitive network has a second set of selectable capacitive values.

18. The NFC apparatus of claim 14, wherein each set of parameters of the respective sets of parameters comprises:
- a respective voltage at the antenna;
- a respective current delivered in the matching circuit by the NFC controller; and
- a respective phase between the respective current delivered by the NFC controller and a respective current received by the NFC controller.

19. The NFC apparatus of claim 14, further comprising a microcontroller coupled to the NFC controller, the microcontroller incorporating the software module and the NFC controller incorporating the setting circuit.

20. The NFC apparatus of claim 12, wherein the NFC apparatus is a NFC reader.

21. A near field communication (NFC) apparatus comprising:
- a NFC controller;
- an antenna coupled to the NFC controller through a matching circuit;
- the matching circuit comprising a first tuning capacitive network coupled in series between the NFC controller and the antenna, and a second tuning capacitive network coupled to the NFC controller and the antenna and to a reference terminal;
- a control circuit configured to determine tuning capacitive values of the first and second tuning capacitive networks to adjust a delivered output power at a desired level; and a setting circuit configured to set the capacitive values of the first and second tuning capacitive networks to the tuning capacitive values, wherein the control circuit comprises:
- a measurement circuit configured to measure for a plurality of capacitive values of the first and second tuning capacitive networks, respective sets of parameters, and
- a software module configured to execute a search algorithm using the respective sets of measured parameters and select the tuning capacitive values of the first and second tuning capacitive networks based on the respective sets of measured parameters and a set of corresponding target parameters, wherein the software module is configured to determine a minimum of a weighting function of the respective sets of measured parameters and the set of corresponding target parameters.

22. The NFC apparatus of claim 21, wherein the first and second tuning capacitive networks each have a variable capacitive value, and wherein the software module is configured to calculate for each pair of selectable values respectively belonging to the first and second tuning capacitive networks and designated by the search algorithm, a value of the weighting function and to select as the tuning capacitive values the pair of selectable values corresponding to a minimum value of the weighting function.

23. A near field communication (NFC) apparatus comprising:
   a NFC controller;
   an antenna coupled to the NFC controller through a matching circuit;
   the matching circuit comprising a first tuning capacitive network coupled in series between the NFC controller and the antenna, and a second tuning capacitive network coupled to the NFC controller and the antenna and to a reference terminal;
   a control circuit configured to determine tuning capacitive values of the first and second tuning capacitive networks to adjust a delivered output power at a desired level; and
   a setting circuit configured to set the capacitive values of the first and second tuning capacitive networks to the tuning capacitive values, wherein the control circuit comprises:
   - a measurement circuit configured to measure for a plurality of capacitive values of the first and second tuning capacitive networks, respective sets of parameters, and
   - a software module configured to execute a search algorithm using the respective sets of measured parameters and select the tuning capacitive values of the first and second tuning capacitive networks based on the respective sets of measured parameters and a set of corresponding target parameters; and
   a memory configured to store a set of reference search algorithms, and a management module configured to select the search algorithm among the set of reference search algorithms.

24. A circuit comprising:
   a near field communication (NFC) controller;
   an antenna terminals coupled to the NFC controller through a differential matching circuit and configured to be coupled to an antenna;
   the differential matching circuit comprising a first tuning capacitive network coupled in series between the NFC controller and the antenna terminals, and a second tuning capacitive network coupled to the NFC controller and the antenna terminals and to a reference terminal;
   a control circuit configured to determine tuning capacitive values of the first and second tuning capacitive networks to adjust a delivered output power at a desired level;
   a setting circuit configured to set capacitive values of the first and second tuning capacitive networks to the tuning capacitive values;
   a measurement circuit configured to measure for a plurality of capacitive values of the first and second tuning capacitive networks, respective sets of parameters; and
   a software module configured to execute a search algorithm using the respective sets of measured parameters and select the tuning capacitive values of the first and second tuning capacitive networks based on the respective sets of measured parameters and a set of corresponding target parameters, wherein each set of parameters of the respective sets of parameters comprises:
   a respective voltage at the antenna;
   a respective current delivered in the matching circuit by the NFC controller; and
   a respective phase between the respective current delivered by the NFC controller and a respective current received by the NFC controller.

* * * * *